(12) United States Patent
Hawks et al.

(10) Patent No.: US 6,749,820 B2
(45) Date of Patent: Jun. 15, 2004

(54) CHLORIDE/SULFATE REMOVAL SYSTEM

(75) Inventors: Ronald L. Hawks, Raleigh, NC (US); James J. Schwab, Napa, CA (US)

(73) Assignees: Envirocare International, Inc., Novato, CA (US); Environmental Quality Management, Inc., Durham, ND (US)

( * ) Notice: Subject to any disclaimer, the term of this patent is extended or adjusted under 35 U.S.C. 154(b) by 131 days.

(21) Appl. No.: 09/797,203

(22) Filed: Feb. 28, 2001

(65) Prior Publication Data

US 2004/0071620 A1 Apr. 15, 2004

Related U.S. Application Data

(63) Continuation-in-part of application No. 09/064,015, filed on Apr. 20, 1998, now Pat. No. 6,464,952.

(51) Int. Cl.⁷ ............................................... C01B 17/22
(52) U.S. Cl. ............................ 423/243.08; 423/243.01; 423/244.07; 423/244.08
(58) Field of Search ........................ 423/243.08, 243.01, 423/244.07, 244.8

(56) References Cited

U.S. PATENT DOCUMENTS

| | | | |
|---|---|---|---|
| 3,984,217 A | 10/1976 | Huntington | 55/20 |
| 4,208,381 A | 6/1980 | Isahaya et al. | 423/210 |
| 4,375,450 A | 3/1983 | Katagiri et al. | 422/170 |
| 4,640,825 A | 2/1987 | Rosenberg | 423/235 |
| 4,666,690 A | 5/1987 | Sommerlad | 423/243.08 |
| 4,708,855 A | 11/1987 | Morrison | 423/235 |
| 4,810,478 A | 3/1989 | Graf | 423/244 |
| 5,165,903 A | 11/1992 | Hunt et al. | 423/239.1 |
| 5,223,239 A | 6/1993 | Moran et al. | 423/640 |
| 5,246,594 A | 9/1993 | Stegemann et al. | 210/743 |
| 5,275,650 A | 1/1994 | Mongoin et al. | 106/465 |
| 5,279,646 A | 1/1994 | Schwab | 95/201 |
| 5,284,637 A | 2/1994 | Merritt et al. | 423/244.07 |
| 5,433,925 A * | 7/1995 | McCord et al. | 422/168 |
| 5,484,471 A | 1/1996 | Schwab | 95/8 |
| 5,759,233 A | 6/1998 | Schwab | 95/8 |
| 6,464,952 B1 * | 10/2002 | Schwab | 423/243.08 |

OTHER PUBLICATIONS

Hawks, et al., "A Proactive Approach to Minimizing Opacity from Cement Kilns," *1995 IEEE Cement Industry Technical Conference*, pp. 451–463, Jun. 4–9, 1995.

Lewis, "Effective Use of Lime For Flue Gas Desulfurization," *National Lime Association Conference Proceedings*, pp. 157–166, Sep. 27–28, 1983.

Tassicker, et al., "High–Intensity Ionizer for Improved ESP Performance," *EPRI Journal*, pp. 56–61, Jun./Jul. 1997.

J. T. McKennon, "The Porta Batch Lime Slurry Method," *Innovations and Uses for Lime*, ASTM STP 1135., pp. 32–40, Philadelphia, 1992.

(List continued on next page.)

*Primary Examiner*—Stanley S. Silverman
*Assistant Examiner*—Jonas N. Strickland
(74) *Attorney, Agent, or Firm*—Sheppard Mullin Richter & Hampton LLP (57) ABSTRACT

The liquid cooling spray in a gas conditioning chamber is modified by the addition of an alkali to scrub sulfuir dioxide and other acid forming gases and a separation unit to remove particles that may contain either unreacted alkali or salts of the acid forming gases. A slurry of fine particles of hydrated lime is injected into the liquid coolant under conditions that result in kernels of controllable size that contain the alkali or salts from reactions with the acid forming gases. The modified cooling liquid provides for a high sulfur dioxide collection efficiency at a low molar ratio of alkali to sulfur, while the specified kernel size range allows fbr efficient removal of the kernels from the gas.

12 Claims, 8 Drawing Sheets

OTHER PUBLICATIONS

F. Schwarzkopf, et al. "High Surface Area Hydrate WUEL-FRAsorp—Commercial Production and Application," *Innovations and Uses for Lime*, ASTM STP 1135., pp. 96–111, Philadelphia, 1992.

G. Werner, et al., "Electrostatic precipitators in cement plants," *International Cement Review*, pp. 61–65, Aug. 1991.

L. Bier, et al., "Construction and operation of a hydrated lime plant for flue gas desulphurization of the Siersdorf power station," Zement–Kalk–Gips, pp. 207–209, Wiesbaden, No. 8, 1992.

"VenturiPak Gas Scrubbing Systems for Wastewater Applications," EnviroCare Systems, Inc., Novato, California, Product Information Brochure, date unknown.

"MicroMist Evaporative Gas Cooling and Conditioning Systems," EnviroCare International, Novato, California, Product Information Brochure, date unknown.

Robert H. Perry, et al., Chemical Engineers Handbook, $5^{th}$ Edition, pp. 8:51–52, 8:13, and 21:41, 1973.

S. H. Sheth, "$SO_2$ Emissions History and Scrubbing System," Presentation at $33^{rd}$ IEEE Cement Industry Conference, pp. 191–228, Mexico City, May, 1991.

"MicroMist Engineered Systems, Enhancing Dust Collector Performance," EnviroCare International, Novato, California, Product Information Brochure, date unknown.

Riley, et al., "Re–evaluating evaporative gas conditioning: Is feasibility still an issue?," *International Cement Review*, pp. 36–40, Nov. 1990.

N. Biege, et al., "A Changing Environment," International Cement Review, pp. 73–80, Jul., 1997.

Kohl, A.L., Riesenfeld, F.C., Gas Purification, Fourth Edition, 1985.

* cited by examiner

CHLORIDE/SULFATE REMOVAL SYSTEM

CROSS REFERENCE TO RELATED APPLICATIONS

This application is a continuation-in-part of application Ser. No. 09/064,015, filed Apr. 20, 1998 now U.S. Pat. No. 6,464,952.

FIELD OF THE INVENTION

This invention relates generally to the field of air pollution control, and is particularly directed to a system to remove condensed scrubbing products from a gas that has been scrubbed of sulfiur dioxide and other acid-forming gases.

BACKGROUND OF THE INVENTION

Over the past several decades the control of air pollution has become a priority concern of society. The United States and other countries have developed elaborate regulatory programs aimed at requiring factories and other major sources of air pollution to install the best available control technology (BACT) for removing contaminants from gaseous effluent streams released into the atmosphere. The standards for air pollution control are becoming increasingly stringent, so that there is a constant demand for ever more effective pollution control technologies. In addition the operating costs of running pollution control equipment can be substantial, so there is also a constant demand for more energy efficient technologies.

Two well known types of devices to remove common particulates from a gaseous effluent stream are electrostatic precipitators (ESPs) and fabric filter baghouse (FFB) collectors. ESPs are generally recognized as being capable of a high particle collection efficiency of fine particles when the particles have the proper electrical resistivity. FFBs are also generally recognized as being capable of a high particle collection efficiency of fine particles when the particles have the proper characteristics. Typically, pollutant gases are conditioned such that the particulates can be more efficiently filtered by ESPs or FFBs.

However, ESPs and FFBs do not remove many gaseous species. Certain species of acid-forming gases can penetrate conventional particulate collection devices such as ESPs or FFBs resulting in emissions violations, causing downstream corrosion of components, and contributing to visible condensed particles which form typically after exiting the stack. In particular, ESPs and FFBs do not remove sulfur dioxide, hydrogen chloride, or other gases that form acids when dissolved in water.

The acid-forming gases that may be released from an air pollution control system with ESPs or FFBs may violate pollution control standards, may contribute to the "detached plume" phenomena and may contribute to acid rain. Consequently, pollution control systems for applications generating large quantities of acid forming gases, such as coal-fired power plants, often require additional means to scrub acid forming gases from the effluent stream. Other applications where the emission of acid forming gases may be a problem include small coal-fired boilers, municipal waste incinerators, and medical waste incinerators.

Acid forming gases may contribute to the formation of visible plumes of effluent that violate opacity regulations even thought the total quantity of acid forming gases released into the atmosphere is comparatively minor. For example, one air pollution control problem for cement plants is the formation of a detached plume. Experimental studies have identified the detached plumes as being comprised primarily of ammonium sulfate and ammonium chloride particulates that form in the effluent flow and condense as the emissions from the stack cool in the atmosphere a distance from the stack. The ammonium particulates are in a size range of approximately one micron, which is a size that is efficient at scattering and reflecting light. The small size of the particulates and their high scattering efficiency means that an optically opaque plume can be comprised of a comparatively small total mass of ammonium sulfate and ammnonium chloride particulates. These detached plumes consist of a fine white plume that may last for hours or days depending on plant and atmospheric conditions. The plumes are highly noticeable and may violate pollution control regulations for opacity, and are thus a potentially serious problem.

Modern cement plants typically use ESPs or FFBs to reduce particulate emissions. However, these particulate filters do not remove the component chemicals that form detached plunes. In particular, ESPs and FFBs do not capture gaseous sulfur dioxide and gaseous hydrogen chloride which contribute to the chemical reactions that form detached plumes. In principle, an additional chemical scrubber could be added immediately after an ESP or FFB. However, conventional methods to scrub acid forming gases are typically expensive and inconsistent with the economic operation of an energy efficient plant. For example, conventional wet scrubbers, which commonly use spray droplet sizes greater than 1000 microns, typically use 10–100 gallons per minute of scrubbing liquid to scrub 1000 cubic feet per minute of effluent gases (1–10 kilograms of liquid per kilogram of gas). Consequently, the consumption of water, scrubbing chemicals, and energy is large for conventional liquid scrubbers. In addition, conventional liquid scrubbers have highi maintenance costs.

Modern energy efficient cement plants typically use two methods to cool and condition hot process gases before they enter an ESP or FFB. In a first stage of cooling, a gas conditioning tower (GCT) uses a spray of water to cool and condition the gaseous effluent. A second stage of cooling and conditioning is performed when the feed mill is operational by contacting the partially-cooled effluent with the cool wet limestone of the feed mill supplying fresh meal to the kiln.

Typically, the hot cement kiln gases must be cooled to approximately 150° C. to provide efficient collection in an ESP or cooled to approximately 180° C. to protect a FFB from overheating. When the feed mill is on, the gas conditioning tower typically must only cool the gaseous effluent to around 250° C. In the mill-on state, the effluent is further cooled to between 100° C. to 150° C. as a result of contact with the feed meal. However, when the feed mill is shut off, the cooling tower must provide all of the cooling. There are thus two distinct operational states of the cement plant, corresponding to a mill-on and a mill-off condition.

One solution to the problem of sulfur dioxide emissions from a cement plant is to inject a lime slurry into the spray used to cool the GCT. A lime slurry is a desirable scrubbing material in a cement plant because lime is chemically compatible with other chemical constituents of cement, such that cement will not be contaminated if small quantities of lime enter the feed meal subsequent to the GCT. The chemicals in the lime slurry react with sulfur dioxide to produce thermally stable salts, thereby reducing sulfur dioxide emissions. However, conventional approaches to injecting a lime slurry into the cooling water of a GCT have low collection efficiencies and consume large quantities of lime slurry (see, e.g., Satish H. Sheth, "$SO_2$ Emissions History and Scrubbing History", pp. 213–217, 33rd IEEE Cement Industry Conference, Mexico City, Mexico May 1991). Conventional approaches to reducing sulfur dioxide emissions from cement plants are not consistent wit high sulfur dioxide collection efficiencies (e.g., greater than about 50%) with low molar ratios (e.g., less than about 3) of calcium hydroxide to sulfur dioxide. In some applications the maximum achievable sulfur dioxide collection efficiency may be unacceptably low, even at extremely high molar ratios of calcium hydroxide to sulfur dioxide. The large lime consumption required in conventional lime slurry injection schemes increases the operating cost and exacerbates the problems of the clogging and plugging of valves and nozzles. Additionally, the cost of the lime is further increased in conventional lime slurry injection schemes utilizing filtered slaked lime because only a fraction of the slaked lime ends up in the filtered slurry.

There are several factors that have previously made the use of a lime slurry in a GCT spray an inefficient and impractical means to scrub acid-foming gases in conventional pollution control systems used in cement plants. Some of these factors tend to limit the collection efficiency. Generally, the total quantityof spray in a GCT is kept as low as possible to reduce energy costs and water consumption and to minimize the temperature drop through the tower. This reduces the total volume of spray droplets that can absorb gases. The evaporative lifetime of spray droplets in a GCT is also short, typically a few seconds, which reduces the time available for gases to be absorbed. Also, the chemical reaction rates of a lime slurry with the absorbed acid-forming gases may be comparatively slow. In conventional approaches the acid forming gases are not adsorbed and converted into salts in the spray droplets at a fast enough rate to efficiently collect sulfur dioxide using low molar ratios of calcium to sulfur.

Other factors that may make use of a lime slurry in a GCT spray inefficient or impractical are the need to limit or eliminate from the final product alkali material or the salts resulting from the reaction of the lime with acid forming gases, and the need to minimize the deposition of lime-reacted solids from accumulating within a plant. Alkali materials and salts have low volatility and thus accumulate with time, caking up within plant process equipment and presenting corrosion or plugging problems. One conventional method of reducing unwanted alkali deposits is to modify the plant to include an alkali bypass to condense these materials. An alkali bypass, for example, is installed at the kiln outlet to quench some of the gases and collect the alkali materials. Although this is effective, it tends to consume large amounts of energy, which decreases the overall system efficiency, and also removes some of the economically valuable kiln dust along with the alkali condensate.

There are also other applications, such as small coal-fired boilers, municipal waste incinerators, and medical waste incinerators, where the use of a scrubbing spray comprised of a lime slurry is desirable. Lime is a comparatively safe scrubbing chemical whose chemical components are consistent with many different pollution control systems. However, scrubbing acid-forming gases with a spray containing a lime slurry may also be prohibitively expensive in these applications because of slow reaction dynamics and a low reaction efficiency. The inventors believe that there are numerous potential applications for a scrubbing spray comprised of a lime slurry that are rendered impractical because of the poor collection efficiency and large quantities of lime required using conventional approaches.

What is desired is an apparatus and method that permits acid forming gases to be efficiently and economically scrubbed using a spray composed of a cooling liquid and an alkaline chemical. In addition, an apparatus and method is needed to selectively remove both unreacted chemical and reaction products of the scrubbing process from the scrubbed gases.

SUMMARY OF THE INVENTION

The present invention generally comprises an apparatus to create a spray of fine droplets composed of a cooling liquid and an alkali chemical. A two-fluid nozzle is used to create spray droplets preferably having a mean diameter less than about 200 microns. A source of alkaline chemical is injected at a controlled rate into the liquid before it is sprayed. In the case of alkaline earth chemicals, the chemicals must have finely ground hydrated lime particles with a mean diameter less than about 25 microns. Preferably, the mean diameter of these particles is between one to ten microns.

One aspect of the present invention is that the mean particle diameter may be selected such that the particles rapidly release chemical into the spray droplets and substantially dissolve during the evaporative lifetime of a droplet. In one embodiment the source of alkaline chemical is hydrated lime particles. Still another aspect of the present invention is that the mean diameter of the spray droplets may be controlled to increase the surface-tovolume ratio of spray droplets, increasing the absorption rate of sulfur dioxide and other acid-forming gases. Yet another aspect of the present invention is that the characteristics of a spray composed of a liquid and lime slurry may be selected to achieve an efficient sulfur dioxide scrubbing function in a chamber, such as a gas cooling tower.

Another aspect of the present invention is to provide an apparatus and method for the removal of contaminants from a gas stream by reacting the contamninants with an alkali-containing spray to produce particles that can be efficiently removed from the gas. In one embodiment, the amount of hydrated lime or other alkali in each droplet is chosen to result in reaction products having a size and density that allows for efficient separation In another embodiment, the reaction product diameter is sufficiently different from the size of other entrained dust to allow preferential removal of the reaction products.

Reference symbols are used in the Figures to indicate certain components, aspects or features shown therein, with reference symbols common to more than one Figure indicating like components, aspects or features shown therein. The reference symbols used herein are not to be confused with any reference symbols used in the items that have been incorporated herein by reference.

DETAILED DESCRIPTION OF THID INVENTION

There are many pollution control applications where it is desirable to have a cost efficient means to scrub sulfur dioxide and other acid-forming gases using a comparatively safe and ecologically friendly scrubbing spray of an alkaline solution or an alkaline earth slurry. Spray droplets absorb sulfuir dioxide and other acid forming gases to form acids in the spray droplets. For example, sulfiur dioxide reacts with water and oxygen in spray droplets to produce sulrurous and sulfuric acid. According to the present invention, hydrated lime, for example, in spray droplets reacts with absorbed sulfurous acid in the droplet to bind up sulfulr dioxide in the form of a thermally stable calcium sulfate salt according to the reaction: $Ca(OH)_2 + H_2SO_3 + \frac{1}{2}O_2 \rightarrow CaSO_4(s) + 2H_2O(1)$. Calcium sulfate is thermally stable at temperatures greater than 1200° C. Similarly, hydrated lime reacts with hydrochloric acid in a droplet to bind up chlorine as a thermally stable calcium chloride salt according to the reaction: $Ca(OH)_2 + 2HCl(aq) \rightarrow CaCl_2(aq) + 2H_2O$. Calcium chloride is thermally stable at temperatures greater than 1600° C.

However, calcium hydroxide has not been commonly used as the primary scrubbing agent in sprays used to scrub sulfur dioxide or hydrogen chloride from gaseous effluents. The cost of using calcium hydroxide as a primary scrubbing agent is prohibitively expensive in many applications because large quantities of water and lime are required to achieve suofir dioxide collection rates of greater than 80%. In some cases, the large quantities of water and lime are inconsistent with other objectives. For example, a pollution control system that uses large quantities of lime may have problems with clogging and plugging of valves, nozzles, and pipes. Consequently, there are many potential applications where it has been impractical to use hydrated lime as a scrubbing agent to scrub sulfur dioxide and other acid-forming gases from a gaseous effluent.

The present invention generally comprises an apparatus to economically produce a spray composed of a liquid and a hydrated lime slurry that is efficient at scrubbing acid-forming gases. In many applications the spray will also serve to cool the gas flow. The usefulness of the present invention is illustrated with reference to the particular problem of controlling the emissions of acid-forming gases from a modern cement plant. However, the teachings of the present invention are generally applicable to other pollution control systems where it is desirable to efficiently scrub acid-forming gases using a spray comprised of comparatively small quantities of water and neutralizing chemicals.

Figure 1:
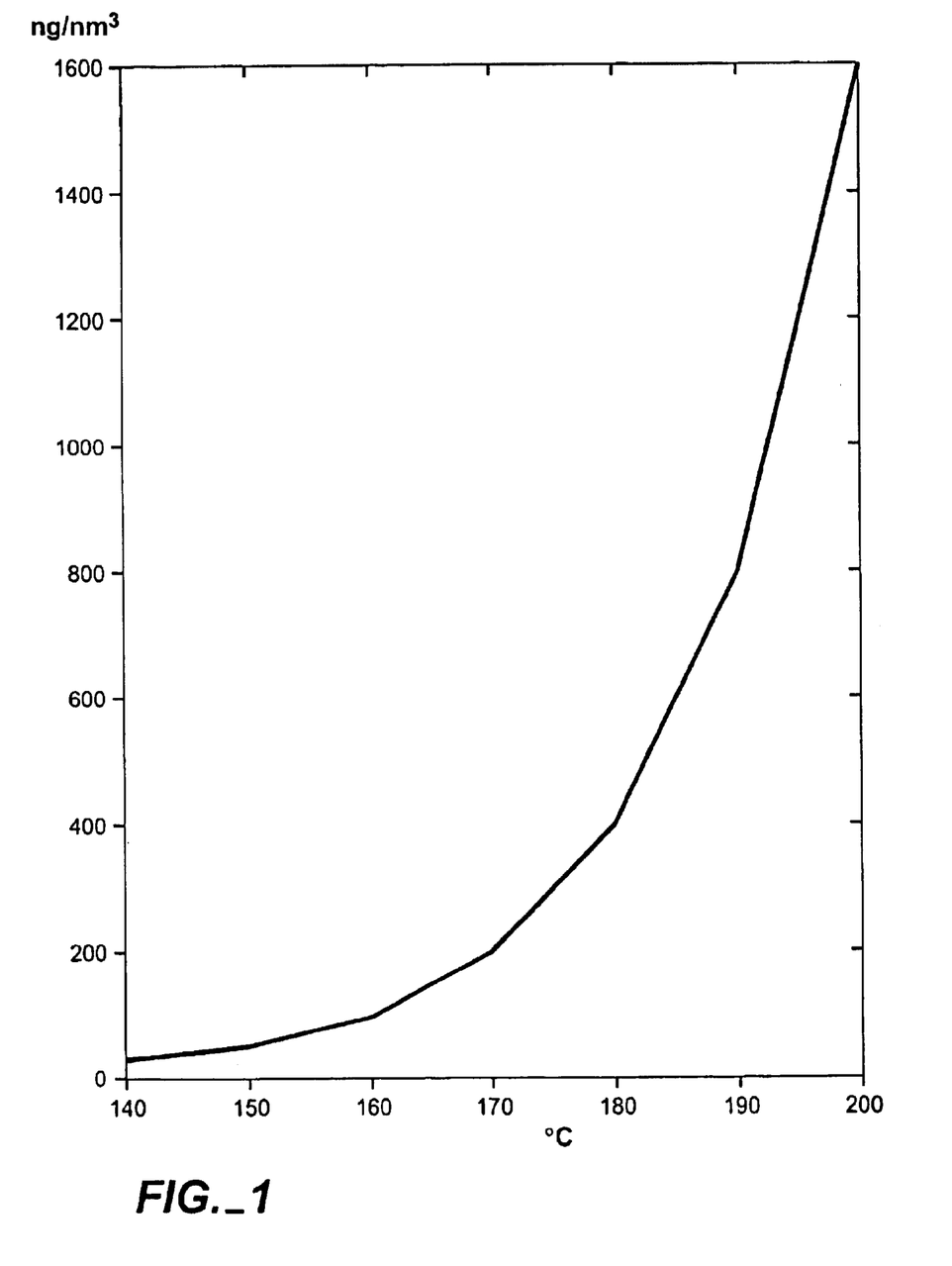
FIG. 1 is a graph showing the relationship between particulate emissions and gas temperature in an electrostatic precipitator used in a modem cement plant.

Modern cement plants often use electrostatic precipitators (ESPs) to control the emissions of particulates from the plant. ESPs are generally recognized as being capable of a high particle collection efficiency, especially of fine particles when the particles have the proper electrical resistivity (see, e.g., Tassicker and Schwab, "High Intensity Ionizer For Improved ESP Performance, pp. 56–58, EPRI Journal (June/July 1977)). The optimum range of dust resistivity in situ is typically between $10^9$ and $10^{11}$ ohm-cm. In many industrial applications, the suspended dust particles in the effluent gas streams are not in this range for the gas conditions entering the ESP. Therefore, the dust particles must be conditioned prior to entry into the ESP by changing the gas temperature or increasing the moisture content of the gases or both (see, e.g., G. Werner, "Electrostatic Precipitators In Cement Plants", International Cement Review (August 1991) pp. 61 et seq.; and J. R. Riley and John M. Tate, "Re-evaluating Evaporative Gas Conditioning: Is Feasibility Still An Issue?" International Cement Review (November 1990), pp. 36 , et seq.). FIG. 1 is a graph of particulate emissions ($mg(Nm^3)$ from a cement kiln/preheater tower versus the temperature (° C.) of the effluent entering the ESP when the gases are conditioned by the evaporative cooling of water. As can be seen in FIG. 1, hot cement kiln/preheater tower gases ($\approx 400°$ C.) must be cooled to around 150° C. to have acceptable particulate emissions of $\leq 50$ $mg/Nm^3$ from an ESP.

Figure 2:
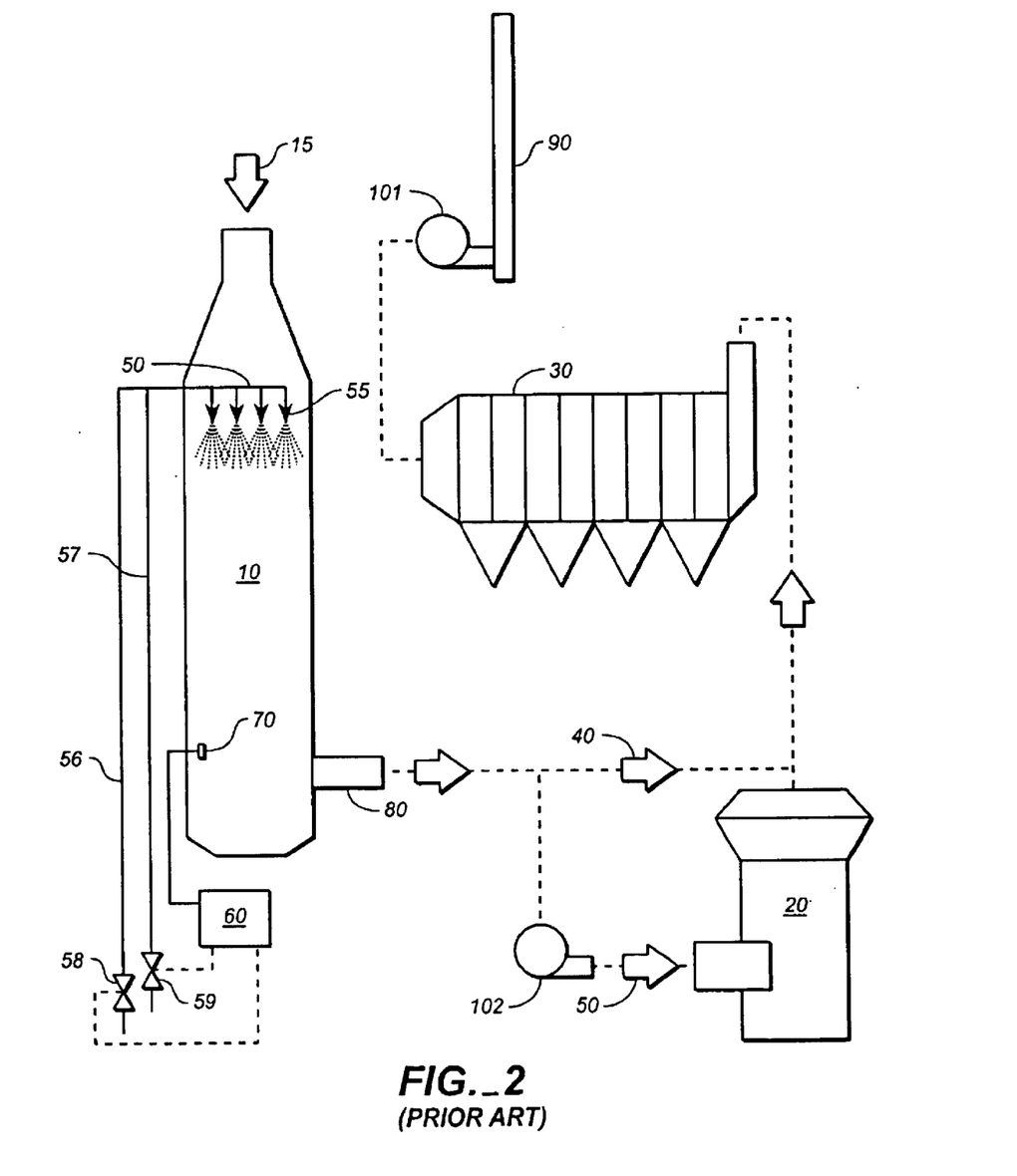
FIG. 2 is a process flow diagram of a typical modern cement plant showing the air pollution control equipment and raw feed mill.

The prior art pollution control system shown in FIG. 2 is representative of a modern, energy-efficient air pollution control system for a cement plant with an ESP that addresses the problem of meeting stringent air pollution control regulations for particle. emissions. As shown in FIG. 2, in a modern pollution control system for a cement plant, hot gases from a preheater tower (not shown) enter a gas conditioning chamber, which may for example be gas conditioning tower (GCT) 10. (The gas flow entering GCT 10, which includes raw meal dust and kiln dust, is shown schematically by flow arrow 15.) Gases entering the GCT may be as hot as 400° C. Nozzle means 50 located within GCT 10, near the entrance thereto, inject a spray of cooling liquid into the hot gas flow in the tower. As depicted, nozzle means 50 preferably comprises a plurality of individual nozzles 55, in order to ensure that the injected spray is evenly distributed into the gas flow, thereby promoting uniform cooling. Preferably, individual nozzles 55 are two-fluid nozzles connected by supply pipes 56 and 57 to a source of water and compressed air, respectively. The flow of water and air to the nozzles is modulated by valves 58 and 59, respectively. Valves 58 and 59 are controlled by logic and control system 60 to maintain a spray of desired quantity and characteristics. Logic and control system 60 preferably is also used to monitor various system parameters and to adjust the spray as conditions change. As is known in the prior art, for example, a temperature sensor 70 may be placed near the exit of GCT 10 to monitor the temperature of the gas flow leaving the GCT. Logic and control system 60 uses the information from the temperature sensor 70 to determine whether the temperature leaving GCT 10 is within a desired target range. If the temperature is outside of the target range, logic and control system 60 responds by increasing or decreasing the quantity of the spray accordingly. Other sensors may also be employed and connected to the logic and control system, such as sensors (not shown in FIG. 1) for measuring the temperature of gases flowing into GCT 10.

Gases, including raw feed and kiln dust, exit GCT 10 via outlet 80 as shown by flow arrow 110 preferably flow into a raw feed mill 20 to help dry and preheat the wet limestone used in the cement plant, and then on to electrostatic precipitator (ESP) 30. However, during a raw mill upset or when the raw feed mill is not in operation, gases flow directly from GCT 10 to ESP 30 as shown by flow arrow 40. After leaving ESP 30, the gases are exhausted into the atmosphere via stack 90. The gases are propelled through the air pollution control system using fans 101 and 102.

The spray characteristics of the two-fluid nozzles 55 can be altered by adjusting the pressure of compressed air and water supplied to the nozzle. In particular, both the quantity of water and the mean size of the water droplets exiting the nozzle may be controlled. A two-fluid nozzle, such as the MICROMIST™ nozzle manufactured by Envirocare International Inc., has spray characteristics that can be suitably adjusted. Typically, the droplet size is adjusted such that the droplets totally evaporate before they exit the GCT, while the quantity of water is adjusted to achieve the desired gas output temperature (e.g., 250° C. for mill-on and 150° C. for mill-off conditions).

Under normal operating conditions, the gases in the system are directed to raw feed mill 20; (this condition will be referred to as the "mill-on" condition). As noted above, the feed stock in feed mill 20 is cool and wet, and presents a relatively large surface area to the hot gases entering the feed mill. Thus, as hot gases from GCT 10 pass through the feed mill they are flurther cooled and moisturized.

While the pollution control system of FIG. 2 is an example of a modern pollution control system that is effective at removing common particulates, it does not address the problem of reducing the concentrations of acid-forming gases, such as sulfur dioxide and hydrogen chloride, in the gaseous effluent stream.

Figure 3:
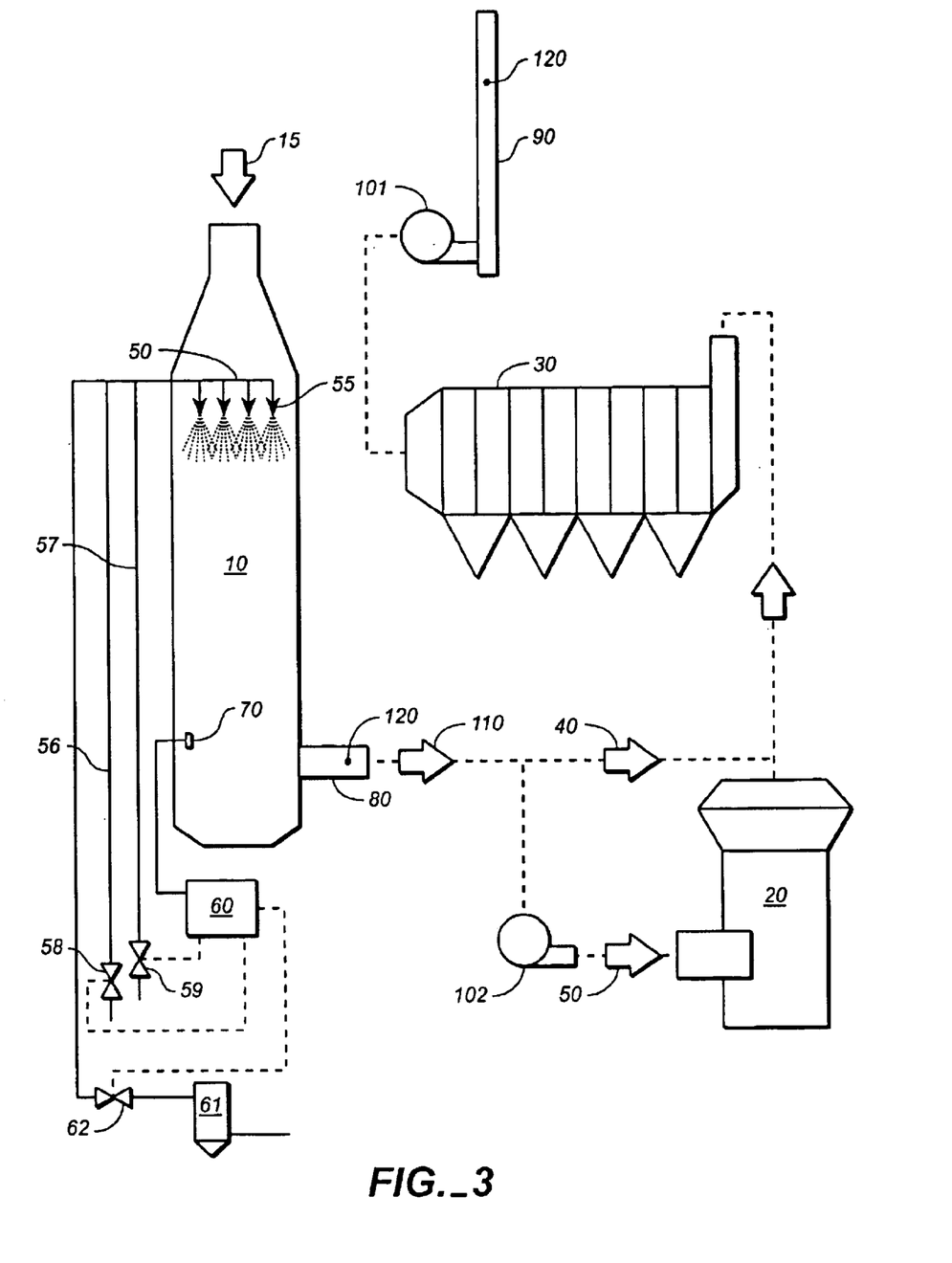
FIG. 3 is a process flow diagram of a first embodiment of the present invention in which additional injectors permit an alkaline solution or an alkaline earth slurry spray from the nozzles in the gas conditioning chamber.

As shown in FIG. 3, the present invention generally may be used in connection with a modern pollution control system (as previously described with reference to the prior art of FIG. 2) with an additional chemical source 61 and a controllable chemical injector 62 to add a controlled quantity of chemical to the liquid sprayed from nozzles 55. Injector 62 receives inputs from logic and control system 60. The chemical source could comprise concentrated alkaline solutions or dry alkaline earth materials, such as hydrated lime, having a small particulate size. Commercially available sources of fee dry hydrated lime may be produced by a variety of methods, such as those produced according to the method of U.S. Pat. No. 5,233,239. Select commercially available sources of fine dry particles of hydrated lime are available with particle sizes on the order of one to ten microns (Mississippi Lime, Ste. Genevieve, Mo., and Chemical Lime, Ad, Fort Worth, Tex.), providing a large surface area for chemical reactions. However, commercially available sources of dry particles of chemically active hydrated lime are comparatively expensive. Hydrated lime particles with a particle diameter of less than 10 micron typically cost approximately $100 per ton. However, shipping costs may also be substantial, particularly in remote locations. Fine, dry hydrated lime particles also have the disadvantage that they must be stored in an inert environment until they are used because of the high chemical reactivity of the hydrated lime. Specifically, atmospheric carbon dioxide readily reacts with hydrated lime to form calcium carbonate, according to the expression: $Ca(OH)_2 + CO_2 \rightarrow CaCO_3(s) + H_2O(l)$. This reaction is undesirable because calcium carbonate is comparatively uneeactive with acid-forming gases.

According to the present invention, slurry source 61 comprises an in-line wet-mill to convert a typical slaked lime slurry into a hydrated lime slurry with a controlled fine particle size. Pebble lime, which consists of coarse, pea-sized particles of CaO, is a comparatively inexpensive and widely available source of CaO. Pebble lime can be obtained from a wide variety of sources, typically at a cost of approximately $60–$80 per ton. The pebble lime may be stored under atmospheric conditions until it is slaked and ground. Only a thin "skin" at the surface of the pebble lime is able to react with atmospheric carbon dioxide to form calcium carbonate. The lime in the interior of the pebble lime is protected and retains its chemical reactivity until it is slaked and ground. On-site grinding of slaked lime or coarse hydrated lime offers an economical means to create the slurry source 61 of chemically reactive hydrated lime with a small particle size. Those skilled in the art are familiar with combinations of slakers, grinders, mills, and classifiers or hybrid mills that perform a classification function simultaneously with the milling or grinding finction. Commercially available slakers, grinders, and classifiers are capable of economically producing large quantities of slaked, ground pebble lime with particles having a controlled mean diameter in the range of one micron to twenty-five microns. Preferably, the lime is slaked and then ground in a wet grinding process such that the ground hydrated lime particles are riot exposed to atmospheric gases, such as carbon dioxide. Suitable wet grinders include commercially available wet ball mils. Such wet mills can be used to produced a slurry with a controlled particle size with particle sizes in the range of one micron to twenty-five microns. Smaller particles sizes typically require increased consumption of energy and result in a lower throughput.

Figure 6:
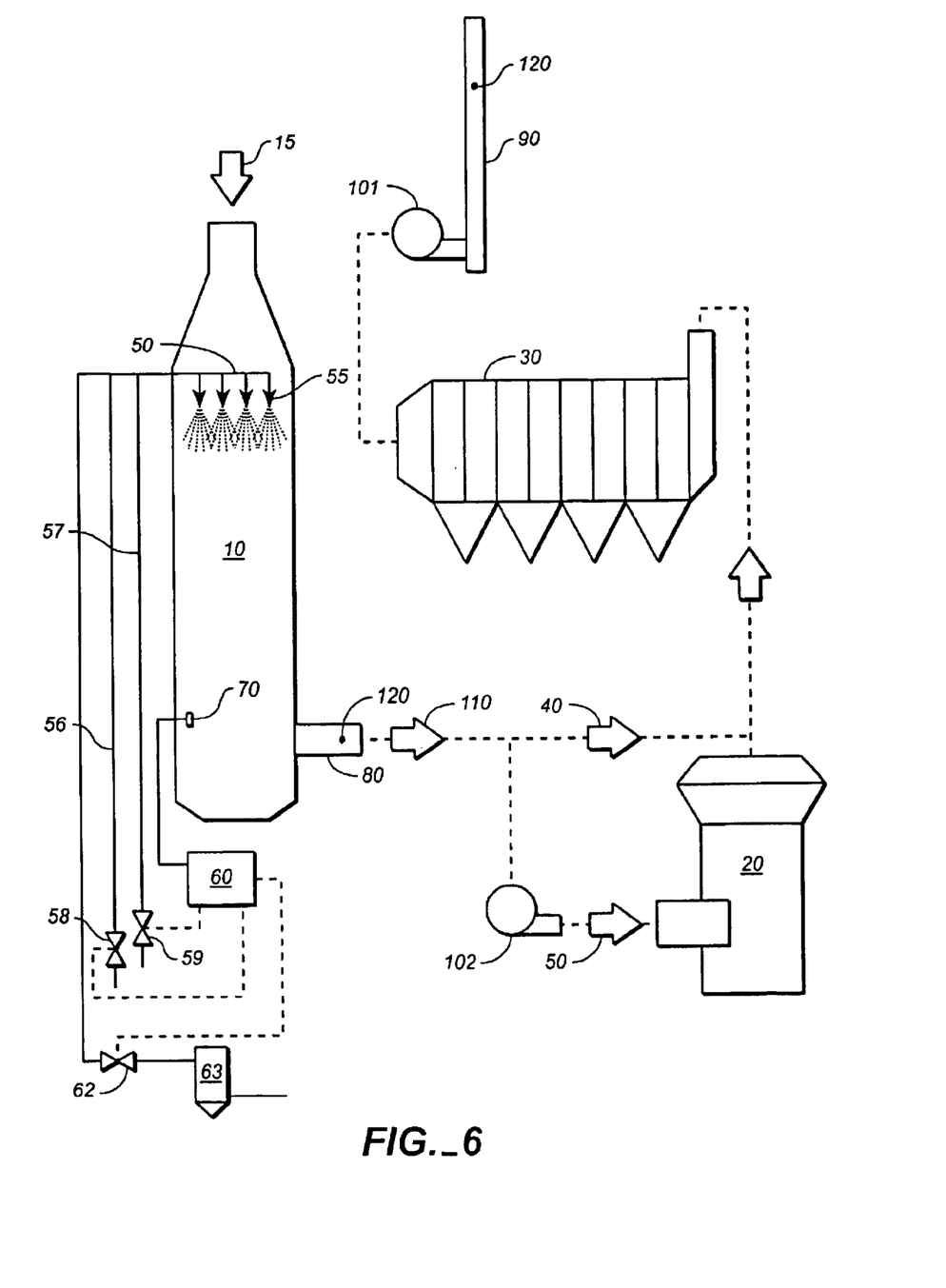
FIG. 6 is a process flow diagram of a second embodiment that is similar to that of FIG. 3 having an in-line mill to form the alkaline earth slurry.

Ground hydrated lime particles with a large surface-to-volume ratio (e.g., particles with a mean diameter of less than twenty-five microns) react rapidly with air. Preferably, according to the present invention the slurry is maintained in an inert ambient environment, such as a sealed or nitrogen purge storage tank. If the slurry is stored in an inert ambient environment, it may be stored for relatively short periods (e.g., less than 24 hours) without substantially decreasing its chemical ractivity. Preferably however, the slurry is prepared substantially as needed using an in-line mill 63 (shown in the second embodiment of FIG. 6) as the slurry source 61 to ensure the highest chemical reactivity of the ground hydrated lime particles in the slurry. Experiments by the inventors indicate that fine particles of hydrated lime can rapidly lose their chemical reactivity if care is not taken to limit potential exposure of the fine particles to atmospheric carbon dioxide. The inventors believe that stringent processing conditions (e.g., reduced exposure to carbon dioxide using the above-described techniques) are required to maintain the chemical reactivity of fine hydrated lime particles (e.g., hydrated lime particles with a diameter less than 25 microns) because of the large surface-to-volume ratio of fine hydrated lime particles.

Prior art cooling tower systems, as in FIG. 2, have mean spray droplet lifetimes that are typically slightly less than half the transit time of gases through the GCT. The present invention has the flexibility to provide the same cooling effects. Specifically, one embodiment of the present invention provides for controlling nozzles 55 is by logic and control system 60 to achieve the desired cooling function (e.g., reducing the gas temperature from 400° C. to 150° C. for the mill-off condition). In another embodiment, the mean diameter of the spray droplets is selected to have a diameter of 120 to 150 microns such that the droplets completely evaporate a comparatively short distance prior to the exit of the GCT.

It is also desirable to prevent plant shutdowns caused by clogged or damaged nozzles and pipes. Preferably, the nozzles are adapted to be chemically resistant to the slurry and further adapted to prevent clogging. The pluggage of nozzles will depend upon the concentration and size of lime particles in the slurry. Preferably, the. concentration of lime particles is kept as low as possible consistent with the desired. scrubbing function. It is also desirable to prevent the scaling of pipes. The solubility of a lime slurry decreases with increased temperature. This can result in scaling of pipes through which slurry is transported if the temperature of such pipes substantially increases in the GCT. Preferably, the temperature of pipes trnsporting slurry in the GCT is maintained at a low enough temperature such that scaling is substantially prevented. One technique to prevent scaling is to use jacketed spray lances to provide a means to cool pipes transporting slurry by flowing air or water through interior of the jacketed lances.

According to the present invention, the cooling spray of a GCT can be modified to efficiently scrub acid-forming gases using comparatively small amounts of an inexpensive alkaline or alkaline earth material, such as a hydrated lime slurry. As is well known to those sklled in the art of chemistry, alkaline or alkaline earth chemicals may react with acid-forming gases to form thermally stable salts such that the acid-forming gas components are captured. However, an alkaline earth slurry would ordinarly not be expected to be a cost-effective, efficient means to scrub acid-forming gases in a GCT used in a cement plant. The evaporative lifetime of a spray droplet in a modern GCT used in a cement plant is commonly about three seconds, although it may vary from one-to-five seconds. This is a relatively short time period for acid-forming gases to absorb into the surface of a droplet, diffuse through the droplet, and react with calcium hydroxide ions released from the slurry particles in the droplet. Moreover, in order for the reaction to be rapid and efficient, the hydrated lime particles suspended in the spray droplets should substantially dissolve during the transit time and evaporative lifetime of the droplet.

According to the present invention, the spray liquid in a conventional GCT can be modified to perform an efficient scrubbing function. As is known, the total quantity of spray is kept as low as possible in a GCT and the evaporative lifetime is short. In order for the spray in a GCT to perform an efficient acid-forming gas scrubbing function the individual droplets should rapidly absorb pollutant gases and chemical agents in the droplets should rapidly scrub (e.g., react with) the pollutant gases. Additionally, chemical scrubbing agents and reacted products should otherwise be compatible with the economic operation of a cement plant. It is desirable that the cost of the chemical scrubbing agent should be low and the chemical scrubbing agent and reacted products not damage or clog pipes, valves, or fittings in the cement plant. It is also desirable that the scrubbing chemical not contaminate the feed meal or deleteriously alter the alkali balance of the feed meal.

Several aspects of the present invention make an efficient scrubbing process using an alkaline or alkaline earth chemical feasible. First, the present invention utilizes a two-fluid nozzle. Modern two-fluid nozzles, such as the MICROMIST™ nozzle, are capable of substantial control of median droplet size and with a narrow distribution in droplet size (by adjusting the compressed air pressure). The use of such a two-fluid nozzle facilitates an efficient scrubbing process because: 1) the initial surface-to-volume of the droplets is large such that the absorption of gases is rapid; 2) most of the droplets have substantially the same initial diameter and hence substantially the same quantity of slurry particles, which facilitates uniform chemical reaction dynamics in the droplets; and 3) each droplet will have a similarly large lifetime (typically one-to-five seconds), since the median droplet size is selected such that the droplets evaporate proximate to the exit of the GCT. Second, the present invention can use a finely ground hydrated lime that is highly reactive. A finely ground hydrated lime with a mean diameter in the range of one-to-twenty-five microns is highly chemically reactive, in large part because it has an extremely large surface area relative to its volume. The large surface-to-volume ratio of the hydrated lime particles increases the rate at which calcium hydroxide dissolves in the spray droplets. Decreasing the mean diameter of the hydrated lime particles substantially below 25 microns facilitates faster dissolution of the hydrated lime particles. According to the present invention, the release of calcium hydroxide from the dissolving hydrated lime particles preferably occurs at a rapid enough rate that it does not limit the reaction that converts absorbed acid-forming gases into salts. A scrubbing process is likely to achieve a low molar ratio of calcium to sulfur if hydrated lime particles from the injected slurry substantially dissolve in the droplets before the droplets evaporate. For common GCT evaporative lifetimes of one-to-five seconds, the hydrated lime particles preferably have a mean diameter between one-to-ten microns such that the hydrated lime particles substantially dissolve in spray droplets in the GCT during their evaporative lifetime as ions are consumed.

Preferably, the spray droplet size is selected to achieve a high collection efficiency. However, there are tradeoffi between the surface area of spray droplets and their evaporative lifetime. GCTs used in cement plants typically use spray flow rates corresponding to about one gallon per minute (GPM) per 1000 cubic feet per minute of effluent gas flow (0.1 kilogram of liquid per kilogram of gas). For a constant quantity of spray liquid, decreasing the spray droplet size increases the initial surface area of the droplet but also decreases the evaporative lifetime of the droplets. For example, for plant conditions corresponding to the mill-off state, spray droplets with an initial diameter of 250 microns have an evaporative lifetime of about 5 seconds. By way of comparison, if the same quantity of liquid is sprayed as droplets having an initial diameter of 50 microns, the surface area increases by a factor of 25. However, the evaporative lifetime in the mill-off state for droplets having an initial diameter of about 50 microns is reduced to less than one second. Smaller spray droplets have a larger surface area to absorb gases but have a comparatively shorter evaporative lifetime for chemical reactions to occur inside the droplet. The unreacted alkali and the salts that are the product of the reaction of the alkali with acid forming gases generally have a low volatility. At the end of the evaporative lifetime, a solid "kernel" containing these materials remains. The size of each kernels is controlled by the initial amount of lime, or other alkali, initially present in the drop and the scrubbing reactions. The ability to control the size range of kernels and some practical consequences of this control will be discussed subsequently.

One important variable in deciding how much lime slurry to inject is related to the spray characteristics (droplet size and total quantity of liquid sprayed) which is also a function of operational state (mill-on or mill-off). The pH should be selected such that salts are formed at a rapid rate in the spray. A high pH (e.g., greater than 12) increases the solubility of acid-forming gases in the droplets. Preferably, the spray is a saturated lime solution with a pH approaching a saturation limit of about 12.

In cement plant applications a high pH is also desirable because it reduces the solubility of ammonia in spray droplets. The absorption of ammonia in such plants is undesirable, as ammonium sulfate salts are not thermally stable at common GCT temperatures (e.g., greater than 235° C.). Any ammonium sulfate formed in a droplet can decompose when the droplet evaporates, re-releasing ammonia and sulfuir dioxide. Additionally, ammonia-containing particles are likely to be collected by dust collection systems and be recycled into the plant. In either case, this reduces the efficiency of the reactions that convert acidic gases into thermally stable salts. The efficiency of the scrubbing process thus increases when the quantity of lime slurry is increased such that the droplets retain a high pH during their evaporative lifetime in the GCT.

Figure 4:
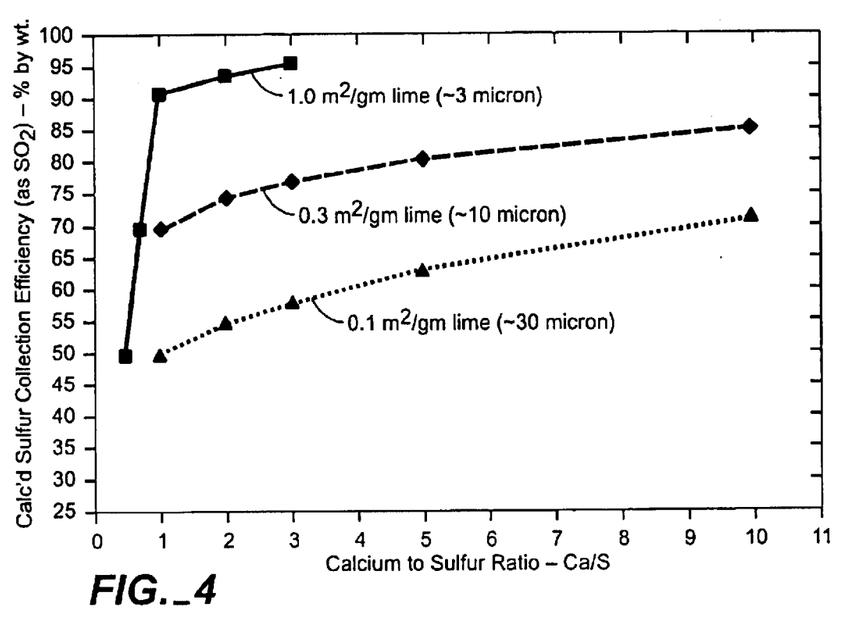
FIG. 4 is a plot of calculated sulfur collection efficiency versus molar ratio of calcium to sulfur for a gas conditioning chamber in which the spray droplets have a mean evaporative lifetime of approximately three seconds.

The dependence of sulfur dioxide collection efficiency as a function of lime particle size in a gas cooling tower has been experimentally measured by the inventors. The experimental techniques to measure suflir dioxide collection efficiency are well known to those skilled in the art. FIG. 4 is a plot of sulfur dioxide collection efficiency versus the molar ratio of calcium to sulfur. As shown in FIG. 4, there is strong dependence of sulfur dioxide collection efficiency on the lime particle size. The experimental conditions correspond to 257,800 kg/hr of hot gases with 56 kg/hr of sulfur. The input temperature of the gas was 375° C. The spray characteristics were adjusted to achieve an output temperature 140° C. and an evaporative lifetime of approximately 3 seconds. The collection efficiency was calculated for hydrated lime particles with a diameter of 3 microns, 10 microns, and 30 microns. The collection efficiency rises with increasing calcium to sulfur ratios (e.g. a higher concentration of slurry) but tends to plateau at high calcium to sulfur ratios. A collection efficiency of 90% can be achieved with a calcium to sulfur molar ratio of one for the 3 micron diameter lime particles. This means that a comparatively small quantity of hydrated lime may be used to efficiently scrub sulfiur dioxide. This reduces operating costs and helps prevent clogging and plugging of valves and nozzles.

Figure 5:
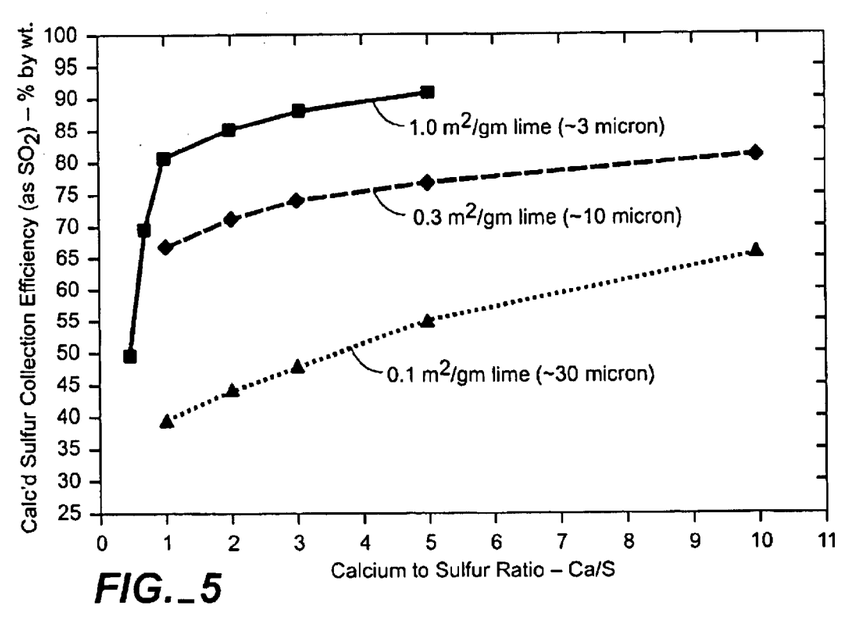
FIG. 5 is a plot of calculated sulfur dioxide collection efficiency versus molar ratio of calcium to sulfur for a gas conditioning chamber in which the spray droplets have a mean evaporative lifetime of approximately two seconds.

The above described experiment was also performed under identical conditions except with the spray characteristics adjusted to achieve an evaporative droplet lifetime of approximately two seconds. As shown in FIG. 5, the plot of calculated sulfur dioxide collection efficiency versus calcium to sulfuir molar ratio are strongly dependent on the size of the lime particles and the calcium to sulfur ratio. However, the collection efficiency is reduced slightly compared to the case where the evaporative droplet lifetime is three seconds.

The present invention permits suilir dioxide to be efficiently scrubbed using a relatively small quantity of lime. The inventor attributes the very high efficiency of the present invention to the small size of the hydrated lime particles and the comparatively small size of the spray droplets. The spray droplets preferably have, an initial mean diameter less than 200 microns such that they have a large enough surface area to absorb a large load of acidic gases during their evaporative lifetime. Additionally, the hydrated lime particles have a large enough surface-to-volume ratio that they can rapidly release the calcium and hydroxide ions in the spray droplets. The high $SO_2$ collection efficiency and low molar ratios of hydrated lime to sulfur dioxide that has been demonstrated indicate that fine particles of lime (e.g., particles with a mean diameter less than 5 microns) substantially dissolve in the spray droplet during the two-to-three second evaporative lifetime of spray droplets.

Although the experimental results for sulfur dioxide collection efficiency have been described, similar behavior has been observed for other acid-forming gases, such as hydrogen chloride. The large surface-to-volume ratio of the spray droplets and the fine hydrated lime particles favor the rapid absorption and conversion of other acid-forming gases into thermally stable salts.

The scrubbed gases exiting outlet 80 carries raw feed dust, kiln dust and kernels of reacted or partially reacted scrubbing material. One conventional approach to handing kernels from a scrubbing system is to allow both the dust and kernels to be captured and recirculated through the cement process, allowing for recovery of valuable kiln dust. This may result in kernels becoming incorporated into the cement, which may present a quality control problem. Specifically, the presence of the kernels, which can contain unreacted alkali, or reacted alkali in the form of sulfur-or chlorine-containing salts, can rmodify the properties of the final cement product. In addition, material that is not incorporated into the clinker or otherwise removed from the process flow can eventually condense out of the process gas, presenting a maintenance problem. The accumulation of condensable material is conventionally controlled with an alkali bypass, in which a portion of the gas is diverted and cooled to condense out less volatile species. The condensate can then be removed from the process stream. While an alkali bypass is effective, it consumes large amounts of energy and wastes valuable kiln dust that is removed along with the condensate.

Removal of the kernels by separation from the scrubbed gases and kiln dust at the exit of the GCT 10 is one way of mitigating these problems. The following examples illustrate the inventive method and apparatus as applied to separation of particles resulting from a scrubbing process in a cement plant. The teachings contained herein may be modified or may be applied to other processes as would be obvious to those skilled in the art. In addition, many methods and apparatus for separation of particles from a gas flow are know in the art. The following examples are not intended to limit the scope of the present invention.

Figure 7:
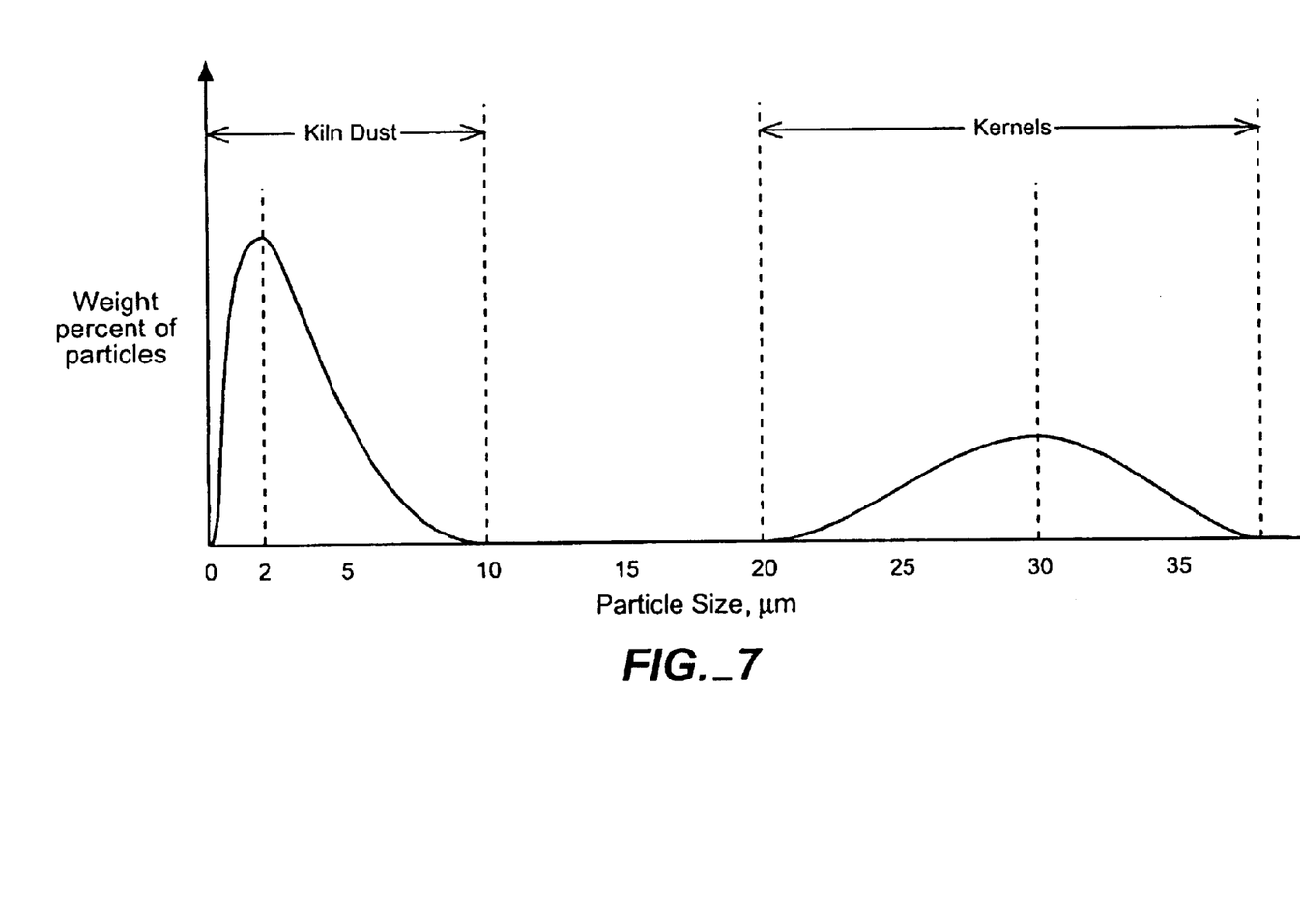
FIG. 7 is plot of the particle distribution of kiln dust and kernels by weight percent after the reaction of alkali-containing sprays with acid gases.

The present invention provides for a solution to problems resulting from alkali addition by selectively removing kernels from the gas, while leaving the kiln dust for recirculation. By properly selecting the size and concentration of alkali in a cooling tower spray, it is possible to generate kernels that are separable from both the kiln exhaust and the kiln dust. Kiln dust is generated with a wide range of sizes in various mills and is filtered by having gone through the cement making process, either by being incorporated into the clinker, by being deposited on walls, or by passing into baghouses. As a result, the dust passing through the GCT has a rather limited range of sizes and densities. Kernels are formed within the GCT from reacting alkali-containig drops, and thus have a size range determined by the amount of reactant in each drop. FIG. 7 presents a graph of the typical size distribution of particles exiting a conditioning tower (as in outlet 80, for example). The curve of FIG. 7 has been experimentally determined using a slurry containing microfine lime and as measured with absorption spectroscopy. This curve is bimodal, with one maximum at a particle size, or diameter, of approximately 2 $\mu$m and a second maximum at a particle size of approximately 30 $\mu$m. As indicated in FIG. 7, the peak indicative of smaller particles is primarily due to kiln dust, and the peak indicative of larger particles is primarily due to kernels.

For the conditions for which the curve of FIG. 7 was obtained, the amount of lime in each drop, which had an initial diameter of about 120 to 150 µm, was varied to give kernels having a mean diameter of from 20 to 40 µm. As shown in FIG. 7 the mean aerodynamic particle diameter of kiln dust ranged from 0 to about 9 µm, while the kernels ranged in size from about 20 µm to about 40 µm. The kiln dust is found to have a specific density of from 1.5 to 2.5 gm/cm$^3$, and the kernels have a density of from 1.5 to 2.0 gm/cm$^3$. The similar densities and differences in size can be used to selectively separate the particles from the gas according to their origin.

Figure 8:
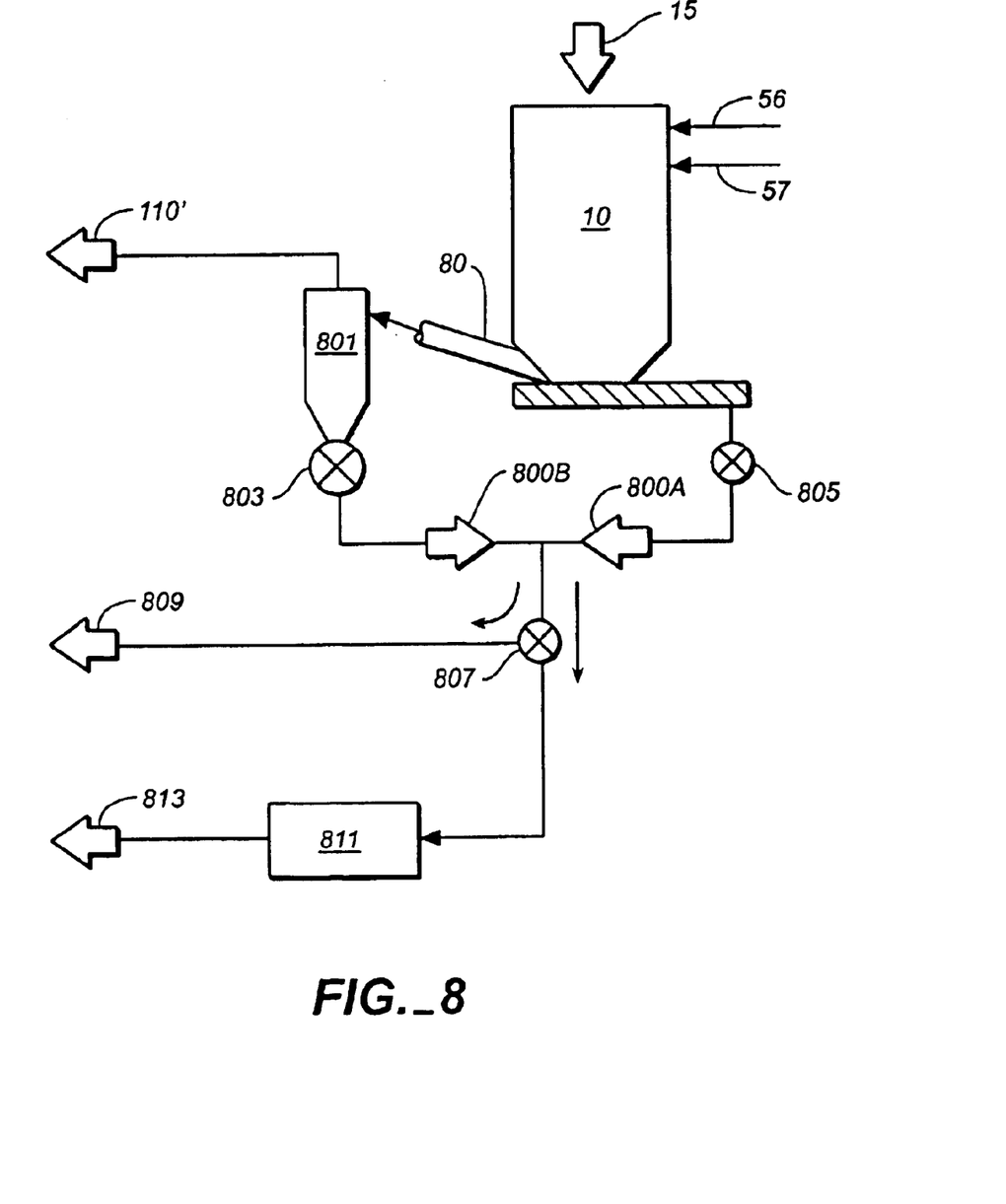
FIG. 8 is a process flow diagram of a third embodiment of the present invention, in which containant-containing kernels are selectively removed from the process gas stream in a separation unit.

A third embodiment of the present invention, as shown in the process flow diagram of FIG. 8, provides for separating the kiln dust from the kernels according to the size difference of the two types of particles using a cyclone separation unit 801. The flow leaving the GCT 10 from outlet 80 is separated into three components—1) kernels that settle to the bottom of GCT 10 and are removed as flow 800A; 2) kernels that are separated from the scrubbed gases using the cyclone 801 and removed as flow 800B; and 3) filtered flow 110' that is used as a process gas. The separation of the flow is in contrast to the previous embodiments, where all of the gases leaving the GCT 10 were cycled through the balance of the plant as a process gas. In this embodiment the process gas 110' contains scrubbed kiln gases and a majority of the kiln dust from the GCT 10. As a result nearly no alkali or reacted alkali salts containing sulfur, chlorine or other components of the acid forming kiln gases need be used for further processing into cement. Alternative methods for separation of kernels from the remaining gases and particles include setting chambers, electrostatic chambers, filters, or other methods or devices capable of separation of one size range of particles from another in a gas flow.

The kernels removed in flows 800A and 800B can be collected and disposed of or can be used in other parts of the cement plant, such as being used as an additive for mortar or other beneficial uses. The various options for conveying the kernels are illustrated in FIG. 8. The flow of the kernels is controlled by a valve 803 and a valve 805, which control the flow 800B from the cyclone 801 and the flow 800A from the GCT 10, respectively. Flows 800A and 800B are combined and through a three-way valve 807 become flow 809 for use in a process or are accumulated in a receiver 811 for disposal 813.

Figure 9:
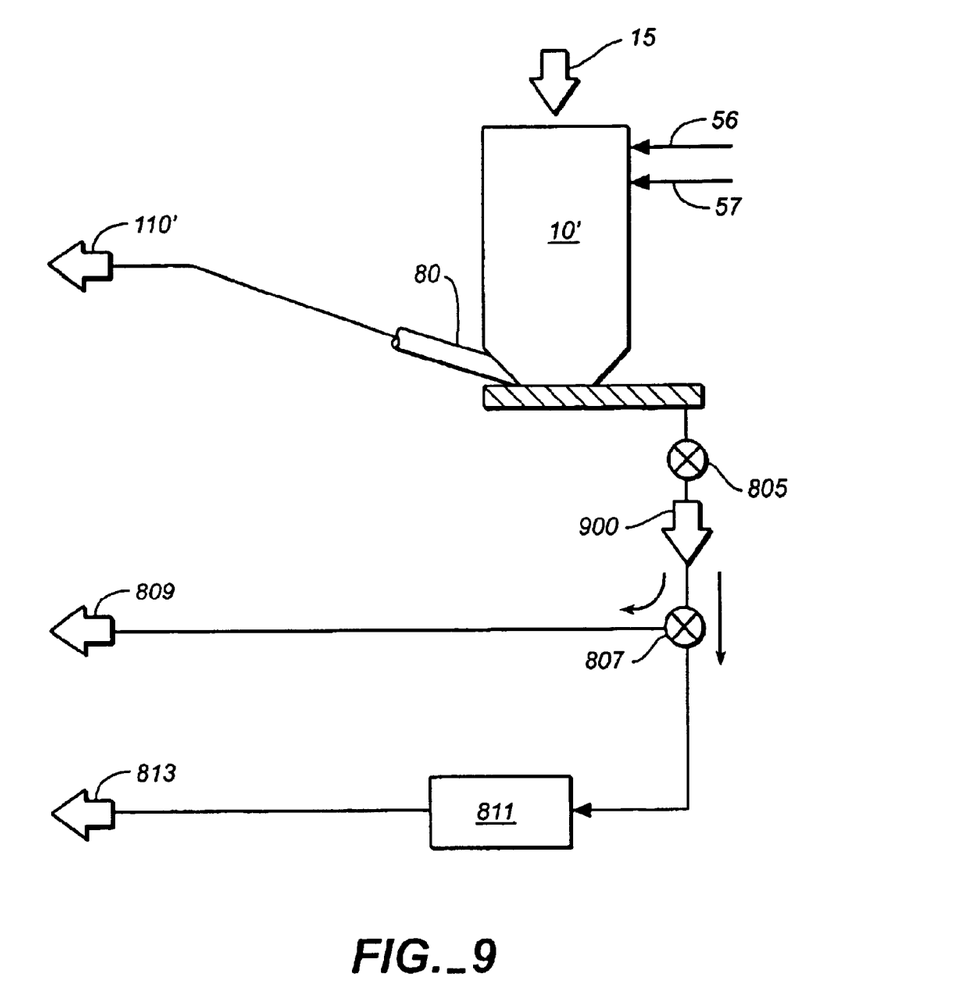
FIG. 9 is a process flow diagram of a fourth embodiment of the present invention, in which contaminant-containing kernels are selectively removed from the process gas stream in a combined conditioning chamber/keemel separator.

In a fourth embodiment, as shown in the process flow diagram of FIG. 9, the functions of the gas cooling tower and separation unit (for example, GCT 10 and cyclone 801) are combined in a single GCT/separator 10'. As in the third embodiment, the separation can be accomplished by variety of techniques known in the art. One particular apparatus would enlarge the GCT 10 of one of the previous embodiments and provide a flow path that would encourage particles to collect near a trap at the bottom of the GCT/separator 10'. The resulting flow 110' would contain scrubbed gases with kernels filtered out, while the kernel flow 900 could be used similar to the combined flow 800A and 800B of the third embodiment.

Other variations on the present invention are also possible. In particular, chemical sensors 120 could be added at various sites in a cement plant to measure levels of sulfur dioxide. The slurry quantity or the properties of the slurry (e.g., particle size) could be adjusted in response to information from the chemical sensors 120 to maintain the emissions within acceptable limits.

The present invention has been described in detail for a hydrated lime slurry. However, those skilled in the art are familiar with other alkaline earth materials that form salts with acid-forming gases. Those skilled in the art are also familiar with techniques, such as using a slaker, grinder classifier, and mixer to make a slurry source comprised of small diameter alkaline earth particles of other compounds.

The present invention has also been described in detail for the GCT used in a cement plant. However, those skilled in the art of pollution control are familiar with other applications where a spray with an injected alkaline slurry could be used to scrub acid forming gases. For example, the spray nozzles, slurry source, slurry injector, and controller of the present invention do not necessarily have to be disposed in a GCT of a cement plant. The teachings of the present invention could be applied to scrubbing sprays used in a wide variety of applications where it is desirable to efficiently collect sulfur dioxide and other acid forming gases using a spray composed of a liquid and a hydrated lime slurry. However, if the droplets do not completely evaporate in the pollutant stream the effective lifetime of a spray droplet may more properly be defined by a mean transit lifetime in the gaseous effluent stream.

While the present invention has been described with reference to the specific embodiments and elements disclosed, it is understood that other, equivalent embodiments of the invention are possible, and that the practice of the invention is not intended to be limited solely to those embodiments disclosed in this application.

What is claimed is:

1. A method of scrubbing an acid forming gas from an effluent gas flow containing entrained dust particles comprising:

injecting a spray into said effluent gas flow containing entrained dust particles, said entrained dust particles having diameters in a first size range, said injected spray comprising droplets containing an alkali which reacts with the acid forming gas in said effluent gas flow and which evaporates to form solid kernel particles comprising a compound formed from the acid forming gas in a second size range which is different from the first size range; and preferentially removing said solid kernel particles from the effluent gas flow in a particle separator which allows a substantial portion of the dust particles to flow through said separator while capturing said solid kernel particles.

2. The method of claim 1, wherein said acid forming gas is sulfur dioxide, and wherein said effluent gas flow leaving said particle separatator is substantially sulfur-free.

3. The method of claim 1, wherein said acid forming gas is hydrochloric acid, and wherein said effluent gas flow leaving said particle separatator is substantially chlorine-free.

4. The method of claim 1, wherein said alkali is water soluble, wherein said droplets includes water and dissolved alkali, and wherein said acid forming gas contacts and reacts said dissolved alkali.

5. The method of claim 1, wherein said alkali is hydrated lime, wherein said spray is a slurry including water containing dissolved lime and hydrate lime, and wherein said hydrated lime includes lime particles of a size sufficient to maintain a water pH of about 12 or greater.

6. The method of claim 1, wherein said removing has an efficiency that is greater for said solid kernel particles than for the dust particles.

7. The method of claim 6, wherein said removing is removing with a cyclone separator.

8. The method of claim 6, wherein said removing is removing with a settling chamber.

9. The method of claim 6, wherein said injecting and said removing are performed in a conditioning tower.

10. The method of claim 6, wherein said injecting and said removing are performed in a chamber.

11. The method of claim 1, wherein said spray contacts the effluent gas flow for a contact time of less than 5 seconds.

12. The method of claim 1, wherein said spray is a slurry of water and said alkali, wherein said alkali is hydrate lime.

* * * * *